Oct. 19, 1937.     E. KÄGI     2,096,329
STUFFING BOX
Filed June 12, 1934
Fig. 1,
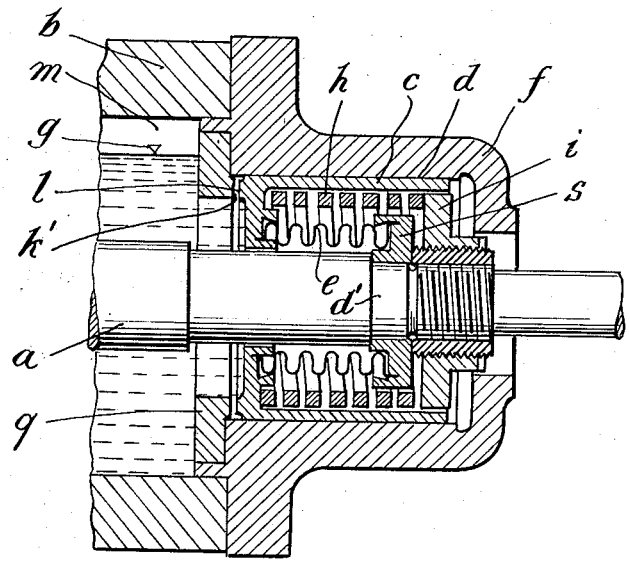
Fig. 2,
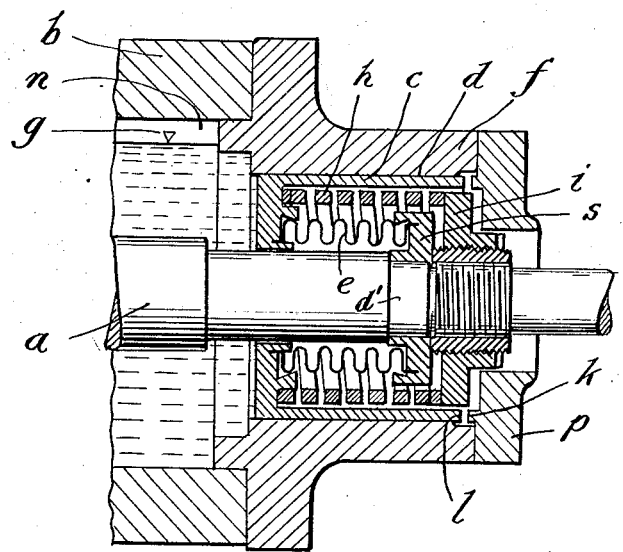
INVENTOR:
EMIL KAGI;
BY
Pennie, Davis, Marvin & Edmonds
HIS ATTORNEYS.

Patented Oct. 19, 1937

2,096,329

UNITED STATES PATENT OFFICE 2,096,329

STUFFING BOX

Emil Kägi, Winterthur, Switzerland, assignor to Sulzer Frères Société Anonyme, Winterthur, Switzerland Application June 12, 1934, Serial No. 730,174
In Switzerland October 7, 1929

10 Claims. (Cl. 286—11)

The present invention relates to stuffing boxes, more particularly, to packings for the rotary shafts in compressors and the like, and has for its object the provision of an improved stuffing box of the kind in which there is a packing member sealed on one side by a diaphragm and adapted to be forced against a shoulder by a spring which acts in opposition to the internal pressure.

A particular object of the invention is to provide a stuffing box for use in connection with machines in which the pressure conditions during operation are different from those when the machine is at rest.

In current practice, the shoulder alone acts as the sole sealing surface present, and this gives rise to the sometimes prohibitive disadvantage that the sealing, or closure, effect of such a packing comes to depend too completely upon that variable, and therefore sometimes low, internal pressure which prevails at the, sometimes, wrong instant.

In applicant's prior U. S. Patent 1,964,063 it is proposed to eliminate this defect and disadvantage by providing contact surfaces which will be longitudinally-extending, and cylindrical, and which can rotate in a constant bath of lubricant to act as the sealing-surfaces between the packing member and its seating; and by adapting the spring so that the packing member will bear against its contact-surface when the internal pressure in the casing falls, but move away from its contact-surface when the internal pressure rises or is kept up. Thus the contact-surfaces constitute chiefly a secondary, or safety, sealing means which operates when the machine stops or when there is operational trouble, and the direct-acting, real packing surfaces remain always under a uniform sealing pressure.

The present invention provides a structure and application of the basic idea of the above mentioned prior patent exhibiting definite advantages and adapted to different situations. The invention includes a packing member surrounding the shaft, sealed to the same by means of a diaphragm, and rotatable and axially slidable upon the interior surface of the stuffing box casing. A spring is arranged to act on the packing member to oppose the internal pressure in the stuffing box, and an annular shoulder is provided having a face to coact with the slidable packing member, thereby acting as a valve. Therefore, when the inner, or chamber-end of the stuffing box is flooded with lubricant or refrigerant to a level above that of the joint, the lubricant cannot possibly leak out of the compressor, whether the machine be stopped or running; or the pressure higher, or lower; nor can gas escape. When the compressor is not running, the packing member will be pressed against the shoulder in such a tight joint as to prevent escape of lubricant, and when the machine is running, the packing member will be moved away from its seating by the pressure-conditions in the compressor, and the lubricant will seep through around the joint between the box and the packing and serve to prevent the usual corrosive gases reaching and damaging the bearings or journals, as well as to perform its usual lubrication functions.

In cases where the internal pressure acting on the packing member against the spring-action is lower when the machine is not running than while it is running, the valve member will be pressed onto the seating by the spring, which in this case overcomes the low internal pressure; and in those cases where the internal pressure is greater when the machine is not running than when it is running, the parts may be so arranged, according to the present invention, that the packing element will be pressed on the seat by the internal pressure which then overcomes the spring.

If desired, two stuffing boxes may be arranged, according to the present invention, in series on the shaft, the inner one being subjected directly to the full pressure within the delivery chamber, and the other to the suction, and the inner box then only deals with the difference between the suction and the delivery pressure.

Two embodiments of the above inventive concept are shown in the accompanying drawing, to further clarify and illustrate the same but are not to be taken as the sole forms of the present invention. In this drawing, Fig. 1 is a longitudinal section of one embodiment, and Fig. 2 is a similar view of another.

In Fig. 1, the rotary shaft to be packed or sealed, $a$, extends into the delivery chamber $m$ of the compressor, part of the outer casing of which is shown at $b$. An annular gland or other packing member, $c$, is arranged to surround a complementary cylindrical surface or journal $d'$, formed on the shaft, and to slide axially and rotate on a surface $d$ in the stuffing box casing. The member $c$ is connected by a diaphragm $e$ to the shaft $a$ by means of an annulus S. A square-helical spring $h$ is arranged between the member $c$ and a nut $i$, which nut engages a threaded-cylinder integral with the shaft. The working-tension of the spring can thus be varied.

The shaft is also surrounded, at its inner end, by a disc q bearing an annular seating k', the latter cooperating, as one member of a valve, with the seat l on the member c.

The inner end of the stuffing box is filled with lubricant up to, say, the level g, in order to prevent access of the corrosive or other gases to the operating bearing and journal surfaces of the shaft and member c.

The spring h is so adjusted that, while the machine is running, the normal working pressure in m acts on the packing member c and, overcoming the pressure of the spring h, moves the member c in a manner such as to remove seat l from face k', thereby opening the valve joint. As soon as the compressor is stopped, the pressure then being lower, the spring h overcomes the low pressure in m and presses the seat l against face k' and provides a gas-tight joint preventing leakage of lubricant and gases between the sliding-joint of the shaft and the packing, as the joint l—k' is, or can be, ground to an impermeable fit.

In the modification shown in Fig. 2, the internal pressure from the delivery chamber m is higher when the machine is stopped than when it is running, and the structure comprises a rotary shaft a, carrying a packing sleeve c, surrounding at d' the shaft and sliding at d on the casing f; a diaphragm e, connected to member c and to a collar s; and a spring h, interposed between the packer c and a fixed nut i. The outer end of member c has a valve-face l, and the end cover plate of the casing has a valve seat k, adapted to be gas-tight. The lubricant is poured into the delivery chamber n to the level g. When the machine is running, the pressure in n is not sufficient to prevent the spring h from forcing the member c away from member p, and the valve l—k stays open, permitting lubricant to seep to the joint between the packing and the shaft to lubricate same and yet prevent the access of gas to the joint and escape of same. When the machine is idle, the then higher pressure in n acting against c, closes the valve k—l and prevents the escape of lubricant and of gas, from the machine.

In the present invention, as compared with the above named prior patent, the packing member slides on the inner surface of the box instead of on the shaft, the diaphragm therefore constituting per se means for sealing off to the shaft instead of to the box, and the shoulder is located on the box instead of on the shaft. The structures of this and the other application are different in their mode of operation, in their effects on the used parts and in their response to troubles and disturbing influences of all kinds, and the device of this application is obviously adapted to take care of different working conditions from the elder one.

Various changes within the scope of the appended claims may be made in the form, construction and arrangement of parts thereof, without departing from the spirit of the invention.

I claim:

1. In a machine in which the internal pressure during operation is different from that prevailing when the machine is at rest, a casing, a rotary shaft passing therethrough, a rotary packing member surrounding said shaft and axially slidable on the casing by means of contact surfaces, said surfaces being of the longitudinally-extending and cylindrical type, adapted to serve as a safety sealing means, a bellows member for sealing said packing member to the shaft, a shoulder for cooperating with said packing to form a valve, and a spring tending to urge said packing against the internal pressure, the tension of said spring being so correlated to the force exerted on the packing member by the internal pressures that the valve is opened when the machine is in operation and is closed when the machine is at rest.

2. In a machine in which the internal pressure is lower when the machine is at rest than when the machine is in operation, a box, a rotary shaft passing therethrough, a packing member surrounding said shaft and axially slidable on said box, a collapsible member sealing said packing member to said shaft, a shoulder on said box cooperating with said packing to form a valve, and means for holding said packing against the shoulder to close said valve when the internal pressure sinks to the value it has when the machine is at rest, but permitting the packing to move to open the valve when the internal pressure rises to the value it has when the machine is working.

3. In a compressor or the like, in which the internal pressure is lower when the machine is at rest than when the machine is in operation, a box, a rotary shaft passing therethrough, a packing member surrounding said shaft and axially slidable on said box, a bellows member sealing said packing member to said shaft, a shoulder on said box cooperating with said packing to form a valve, and a spring tending to hold said packing against said shoulder to close said valve when the internal pressure sinks to the value it has when the compressor is at rest, but permitting said packing to move and said valve to open when the internal pressure rises to the value it has when the compressor is working.

4. In a compressor or the like, in which the internal pressure is lower when the machine is at rest than when the machine is in operation, a box, a rotary shaft passing therethrough, a packing member surrounding said shaft and axially slidable on said box, a bellows member sealing said packing member to said shaft, a shoulder on said box cooperating with said packing to form a valve, and a square-helical spring tending to hold said packing against said shoulder to close said valve when the internal pressure sinks to the valut it has when the compressor is at rest, but permitting said packing to move and said valve to open by the action of the internal pressure, when the internal pressure rises to the value it has when the compressor is working.

5. In a compressor or the like, in which the internal pressure is lower when the machine is at rest than when the machine is in operation, a box, a rotary shaft passing therethrough, a packing member surrounding said shaft and axially slidable on the inner periphery of said box, a bellows member sealing said packing member to said shaft, a shoulder on said box cooperating with said packing to form a valve, means tending to hold said packing against the shoulder to close said valve when the internal pressure sinks to the value it has when the compressor is at rest, but permitting the packing to move to open the valve when the internal pressure rises to the value it has when the compressor is working, and means in said box for allowing lubricant to seep through between said packing and said box when the valve is open.

6. In a compressor or the like, in which the internal pressure is higher when the machine is at rest than when the machine is in operation, a box, a rotary shaft passing therethrough, a packing member surrounding said shaft and axially slidable on said box, a collapsible member sealing said packing member to said shaft, a shoulder on said box cooperating with said packing to form a valve, and means tending to hold said packing away from the shoulder to open said valve when the internal pressure sinks to the value it has when the compressor is working, but permitting the packing to move to close the valve when the internal pressure rises to the value it has when the compressor is at rest.

7. In a compressor or the like, in which the internal pressure is higher when the machine is at rest than when the machine is in operation, a box, a rotary shaft passing therethrough, a packing member surrounding said shaft and axially slidable on said box, a bellows member sealing said packing member to said shaft, a shoulder on said box cooperating with said packing to form a valve, and a spring tending to hold said packing away from said shoulder to open said valve when the internal pressure sinks to the value it has when the compressor is working, but permitting said packing to move and said valve to close when the internal pressure rises to the value it has when the compressor is at rest.

8. In a compressor or the like, in which the internal pressure is higher when the machine is at rest than when the machine is in operation, a box, a rotary shaft passing therethrough, a packing member surrounding said shaft and axially slidable on said box, a bellows member sealing said packing member to said shaft, a shoulder on said box cooperating with said packing to form a valve, and a spring tending to hold said packing away from said shoulder to open said valve when the internal pressure sinks to the value it has when the compressor is working, but permitting said packing to move and said valve to close by the action of the internal pressure, when the internal pressure rises to the value it has when the compressor is at rest.

9. In a compressor or the like, in which the internal pressure is higher when the machine is at rest than when the machine is in operation, a box, a rotary shaft passing therethrough, a packing member surrounding said shaft and axially slidable on said box, a bellows member sealing said packing member to said shaft, a shoulder on said box cooperating with said packing to form a valve, means tending to hold said packing away from the shoulder to open said valve when the internal pressure sinks to the value it has when the compressor is working, but permitting the packing to move to close the valve when the internal pressure rises to the value it has when the compressor is at rest, and means in said box for permitting lubricant to seep through between said packing and said box when the valve is open.

10. In a machine in which the internal pressure during operation is different from that prevailing when the machine is at rest, a casing, a rotary shaft passing therethrough, a rotary packing member surrounding said shaft and being axially slidable on the casing by means of contact-surfaces of the longitudinally-extending, cylindrical type adapted to serve as a safety sealing means, a bellows member for sealing said packing member to the shaft, a shoulder on said casing for cooperating with said packing member to form a valve, and a spring tending to urge said packing member against the internal pressure, the tension of said spring being so correlated to the force exerted on the packing member by the internal pressures that the valve is opened when the machine is in operation and is closed when the machine is at rest, said shoulder being arranged on that side to which the packing member moves when the machine is stopped, said spring being adapted to close the valve with a force sufficient to ensure the perfect sealing of the machine when at rest.

EMIL KÄGI.